United States Patent Office 2,744,135
Patented May 1, 1956

2,744,135
PROCESS FOR PREPARING THREO-1-P.NITRO-PHENYL-2-ACYLAMINO-1,3-PROPANEDIOLS

Alberto Vercellone and Carlo Giuseppe Alberti, Milan, Italy, assignors to Farmaceutici Italia S. A., a corporation of Italy No Drawing. Application August 29, 1951,
Serial No. 244,273

Claims priority, application Italy January 12, 1951

4 Claims. (Cl. 260—562)

The N - acyl - derivatives of threo - 1 - p.nitrophenyl - 2-acylamino-1,3-propanediols are substances of chemical and pharmaceutical interest, in particular D-(-)-threo - 1 - p.nitrophenyl - 2 - dichloroacetamino - 1,3 - propanediol, or chloramphenicol which is a well-known antibiotic active against the microorganisms answerable for typhoid fevers, and active as well against gram-positive and gram-negative bacteria.

The copending U. S. application, Serial No. 244,271, claims a new way of synthesis of threo-1-p.-nitrophenyl-2-amino-1,3-propanediol, based on the migration N→O of the acyl group in N,O-diacylated 1-phenyl-2-amino-1,3-propanediols, as obtained, for example, with SOCl₂ or PCl₅, and on the subsequent nitration of the O,O-diacyl hydrochlorides thus obtained, followed by the hydrolysis of the acyl groups.

It has now been found that in the case of threo-derivatives said migration can be obtained also by means of treatment with solutions of hydrochloric acid in an anhydrous solvent and that if the O,O-diacyl derivatives thus obtained are brought to a pH higher than 7, there takes place a migration in the opposed sense, whereby the N,O-diacyl derivatives are obtained again if the pH is comprised between 7 and 8, while at a pH higher than 8 partial saponification takes place, which brings about the N-monoacyl derivatives. From these findings has arisen the process according to the present invention for preparing threo - 1 - p.nitrophenyl - 2 - acylamino-1,3-propanediols, in particular the N-dichloroacetyl derivative, which as said offers special therapeutic interest.

The term "acyl," as used herein, includes lower aliphatic acyl and halogen substituted lower aliphatic acyl radicals.

According to the present invention, threo-1-phenyl-2-acylamino-3-acyloxy-propan-1-ols are first transformed into the corresponding threo-1-phenyl-1,3-diacyloxy-2-aminopropane hydrochlorides by means of treatment with hydrochloric acid dissolved in an anhydrous solvent (methanol, ethanol, ethyl ether, dioxane, acetone, acetic acid etc.) at a temperature between 0 and 30° C. and then the O,O-diacyl hydrochlorides thus obtained are nitrated at a temperature lower than 0° C. with fuming nitric acid or with mixed acid, both free from nitrous acid, whereafter the p.nitro-derivatives thus obtained are subjected to the migration of an acyl group to the N-position and to the contemporaneous alkaline saponification of the single acyl group that remained in the O-position.

In particular, according to the invention said partial saponification and migration may be effected direct on the previously diluted nitration mixture, or after separating the diacyl nitro-derivative, by alkalizing to a pH higher than 8, at a temperature comprised between 0 and 40° C., if needed in the presence of an organic solvent miscible with water, such as an alcohol and a ketone, both aliphatic, or a cyclic ether, for instance dioxane.

From the final reaction mixture the product—if it does not crystallize—is extracted with a convenient solvent immiscible with water (ethyl acetate, chloroform, ethyl ether etc.).

The process according to the invention is illustrated by the following reaction sheet:

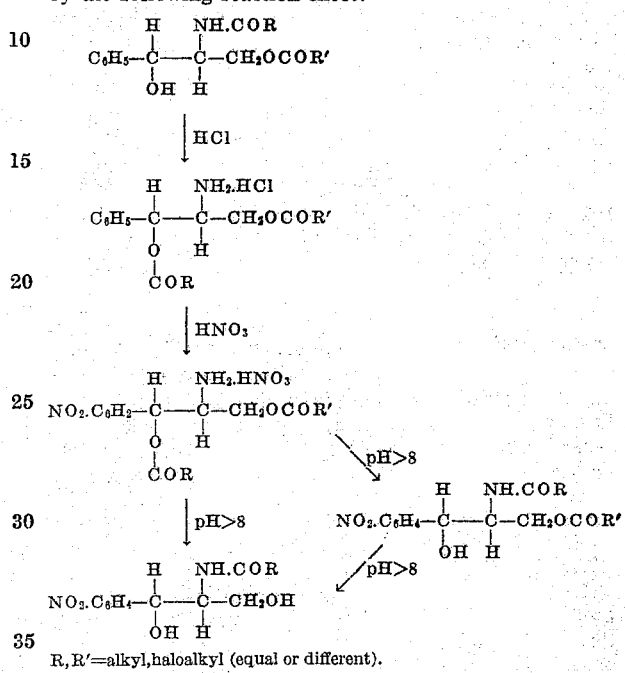

R, R′ = alkyl, haloalkyl (equal or different).

As threo-1-phenyl-2-amino-1,3-propanediol and its derivatives contain two asymmetric carbon atoms, they can exist in the racemic, levogyrate and dextrogyrate forms; it is understood, therefore, that in the present specification and appended claims, if not stated otherwise, both the racemic product and the levogyrate or dextrogyrate forms are referred to.

Some examples of embodiment of the invention are given hereinafter by way of illustration but not by way of limitation.

Example 1

50 g. of threo-1-phenyl-2-amino-1,3-propanediol N,O-diacetate are dissolved in 200 cm.³ of anhydrous ethanol and 50 cm.³ of anhydrous dioxane. 35 cm.³ of gaseous HCl dissolved in anhydrous ethanol 30% by volume are added and left at rest one night. After diluting with 1000 cm.³ of ether, the hydrochloride of threo-1-phenyl-1,3-diacetoxy-2-aminopropane obtained, M. P. 164–165° C., is filtered off. The analysis of the compound gives C=54.38%.

50 grams of said hydrochloride are added in small portions to 500 g. of fuming nitric acid free from nitrous acid, keeping the temperature at —10° C. After 15′ the mass is poured into 1500 g. of ice, is alkalized with sodium carbonate to a pH between 7 and 8 and is extracted with ethyl acetate. By evaporation of the solution, the threo-1-p.nitrophenyl-2-acetamino-3-acetoxy-propan-1-ol crystallizes; it is then re-crystallized from the same solvent (M. P. 162–163°).

50 g. of said compound are dissolved in 700 cm.³ of acetone, cooled down to 0° C., then 250 cm.³ of normal sodium hydroxide are added and it is left at rest for two hours at 0° C.

The excess of sodium hydroxide is accurately neutralized and the acetone is evaporated in vacuo; thus the threo - 1 - p.nitrophenyl - 2 - acetamino - 1,3 - propanediol, M. P. 164–165° C., crystallizes.

*Example 2*

50 g. of threo-1-phenyl-2-dichloroacetamino-3-dichloroacetoxypropan-1-ol are dissolved in 60 cm.$^3$ of anhydrous dioxane; 400 cm.$^3$ of anhydrous ether are added and then 50 cm.$^3$ of gaseous HCl dissolved in anhydrous ether 15% by volume. After six hours, the hydrochloride of threo-1-phenyl-1,3-dichloroacetoxy-2-aminopropane is filtered off and recrystallized from ethanol. M. P. 159–160° C.

50 g. of said hydrochloride are nitrated as in Example 1; the nitration mixture is poured into 2500 g. of ice and, while keeping the temperature at 0° C., it is brought to a pH=10 with sodium hydroxide; it is diluted with acetone until dissolving and is kept at 0° C. for some hours. Subsequently it is neutralized with hydrochloric acid, the acetone is evaporated in vacuo, and the product is extracted with ethyl acetate and crystallized from the solution; it is threo-1-p.nitrophenyl-2-dichloroacetamino-1,3-propanediol, which if re-crystallized from water melts at 149–150° C.

*Example 3*

If operating as in Example 2 but with D-threo-1-phenyl - 2 - dichloroacetamino - 3 - dichloroacetoxy - propan-1-ol, the D-threo-1-phenyl-1,3-dichloroacetoxy-2-amino-propane hydrochloride is obtained and then the D - threo - 1 - p.nitrophenyl - 2 - dichloroacetamino - 3-dichloroacetoxy-propan-1-ol, M. P.=108–110° C., $(\alpha)_D$=+20.1 (ethanol; $c$=4.98) and finally the D-threo - 1 - p.nitrophenyl - 2 - dichloroacetamino - 1,3 - propanediol, M. P.=149–150° C., $(\alpha)_D$=+19° (ethanol; $c$=5), $(\alpha)_D$=−25.5° (ethyl acetate).

We claim:

1. A process for preparing threo-1-p-nitrophenyl-2-acetylamino-1,3-propanediol which comprises reacting a threo - 1 - phenyl - 2 - acylamino - 3 - acyloxy - propane-1-ol, selected from the group consisting of threo-1-phenyl-2-acetylamino-3-acetoxy-propane-1-ol and threo-1-phenyl - 2 - chloroacetylamino - 3 - chloroacetoxy - propane-1-ol, with gaseous hydrochloric acid dissolved in an anhydrous organic solvent at a temperature between about 0 and about 30° C., treating the resulting O,O-diacyl hydrochloride with a nitrating agent of the group consisting of fumic nitric acid and mixed nitric and sulphuric acid at a temperature lower than 0° C., separating the resulting 1-p-nitrophenyl-1,3-diacyloxy-2-aminopropane N-nitrate by filtration, alkalizing, at a temperature between 0 to 40° C., to a pH value higher than 8 and recovering threo-1-p-nitrophenyl-2-acylamino-1,3-propanediol.

2. A process for preparing threo-1-p-nitrophenyl-2-acetylamino-1,3-propanediol which comprises reacting a threo - 1 - phenyl - 2 - acylamino - 3 - acyloxy - propane-1-ol, selected from the group consisting of threo-1-phenyl-2-acetylamino-acetoxy-propane-1-ol and threo-1-phenyl - 2 - chloroacetylamino - 3 - chloroacetoxy - propane-1-ol, with gaseous hydrochloric acid dissolved in an anhydrous organic solvent at a temperature between about 0 and about 30° C., treating the resulting O,O-diacyl hydrochloride with a nitrating agent of the group consisting of fumic nitric acid and mixed nitric and sulphuric acid at a temperature lower than 0° C., separating the resulting 1-p-nitrophenyl-1,3-diacyloxy-2-aminopropane N-nitrate by filtration, adjusting to a pH value between 7 and 8, separating the threo-1-p-nitrophenyl-2-acylamino-3-acyloxy-propane-1-ol thus formed, alkalizing, at a temperature between 0 and 40° C., to a pH value higher than 8 and recovering threo-1-p-nitrophenyl-2-acylamino-1,3-propanediol.

3. The process according to claim 1, wherein the said threo - 1 - phenyl - 2 - acylamino - 3 - acyloxy- propane-1-ol is threo-1-phenyl-2-amino-1,3-propanediol N,O-diacetate.

4. The process according to claim 1, wherein the said threo - 1 - phenyl - 2 - acylamino - 3 - acyloxy - propane - 1 - ol is threo - 1 - phenyl - 2 - dichloroacetamino - 3-dichloroacetoxypropane-1-ol.

References Cited in the file of this patent

UNITED STATES PATENTS

| | | |
|---|---|---|
| 2,483,884 | Crooks et al. | Oct. 4, 1949 |
| 2,483,885 | Crooks et al. | Oct. 4, 1949 |
| 2,538,764 | Crooks et al. | Jan. 23, 1951 |
| 2,538,765 | Crooks et al. | Jan. 23, 1951 |
| 2,695,309 | Carrara | Nov. 23, 1954 |

OTHER REFERENCES

Rebstock et al.: "JACS," vol. 71 (1949) p. 2461.
Controvlis et al.: "JACS," vol. 71 (1949) p. 2468.
Phillips et al.: "JACS," vol. 72 (1950) pp. 4920–21.
Phillips et al.: "JACS," vol. 69 (1947) pp. 203–04.